United States Patent Office 3,751,557
Patented Aug. 7, 1973

---

3,751,557
SOLVENT EXTRACTION PROCESS FOR PURIFICATION OF BERYLLIUM
Hiroshige Suzuki, Tokyo, Hisahiko Einaga, Ohmiya, and Yasumichi Mori, Koshigaya, Japan, assignors to National Institute for Researches in Inorganic Materials, Tokyo, Japan
No Drawing. Filed Mar. 10, 1971, Ser. No. 123,042
Claims priority, application Japan, July 10, 1970, 45/59,901
Int. Cl. C22b 59/00
U.S. Cl. 423—112                                                                                      15 Claims

ABSTRACT OF THE DISCLOSURE

A solvent extraction process for the purification of beryllium using an aminopolycarboxylic acid as a masking or sequestering agent, which comprises (i) preparing an aqueous solution system containing the beryllium compound to be purified, an aminopolycarboxylic acid, water, and a compound selected from the group consisting of $\beta$-ketocarboxylic esters and malonic diesters, with the pH of the solution adjusted to 4.5–9, (ii) extracting the aqueous solution system with a water-immiscible, organic solvent, (iii) back-extracting the resulting organic solvent phase with an aqueous solution of a mineral acid, and (iv) recovering the beryllium compound from the resulting aqueous solution phase.

---

This invention relates to a solvent extraction process for the purification of beryllium, by which beryllium compounds can be refined to very high purity with high yield, with operational advantages and good qualitative reproducibility, using an inexpensive and easily available extracting reagent. More particularly, the invention relates to a solvent extraction process for the purification of beryllium using an amino polycarboxylic acid as a masking or sequestering agent, which comprises (i) preparing an aqueous solution system with the pH adjusted to 4.5–9, which contains a beryllium compound to be purified, an aminopolycarboxylic acid, water, and a compound selected from the group consisting of $\beta$-ketocarboxylic esters and malonic diesters,
(ii) extracting the aqueous solution system with a water-immiscible organic solvent,
phase with an aqueous mineral acid, and
(iii) back-extracting the so extracted organic solvent phase with an aqueous mineral acid, and
(iv) recovering the beryllium compound from the resulting aqueous solution phase.

The production of high-purity beryllium metal and compounds has assumed increasing importance in recent years, partly because of the possibility that the very pure metal might be ductible, and partly because of the utility of the oxide in ceramics for nuclear reactor applications.

Industrial practice has primarily involved fractional crystallization of compounds, or distillation of the metal or volatile compounds. Utilization of an ion-exchange resin also has been proposed. However, none of these known processes is satisfactory for providing an acceptable high-purity product, and each involves very complex procedures.

Therefore, utilization of solvent extraction means for laboratory scale production of a pure beryllium compound or analytical separation thereof has been noticed and studied, and only recently attempts for the solvent extraction on larger scales have been reported.

The latest proposal concerns a system utilizing ethylenediaminetetraacetic acid (EDTA) as a masking or sequestering agent, in which the essential features of the extraction step are the extraction of beryllium into an organic phase as a complex with acetylacetone and the retention of many metallic impurities in the aqueous phase as complexes with EDTA.

As an improvement in the solvent extraction system using acetylacetone-EDTA in relatively small scale practice, Nuclear Science and Engineering, 17, pp. 268–273 (1963) proposes a process comprising preparation of $Be(OH)_2$ solution in acetylacetone and carbon tetrachloride, washing the organic solution with deionized water, extraction of the washed organic solution with an aqueous phase saturated with EDTA which retains metallic impurities as an EDTA complex, back-extraction of the resulting purified organic solution with nitric acid, precipitation of $Be(OH)_2$ by adding pure aqueous $NH_4OH$ to the back-extracted aqueous solution, and calcination of the precipitate to produce high-purity beryllium oxide.

As a still further improvement for practicing the process on an industrial scale, a process resembling the above but requiring still more complex procedures was also disclosed in Nuclear Science and Engineering, 22, pp. 14–19 (1965).

There is also another report on the solvent extraction by a kerosene solution of 2-ethylhexoic acid-EDTA in Nuclear Science and Engineering, 28, pp. 346–352 (1967).

These solvent extraction processes for the purification of beryllium using EDTA as a masking or sequestering agent can provide products of much higher purity than those produced by other known and conventional processes. However, the processes invariably involve complex and difficult operations, achieve only low yield, and acetylacetone employed is rather expensive. Recovering ratio of acetylacetone also is low. Furthermore, the extraction rate in the back-extraction to the aqueous acid phase is coinsiderably low, objectionably prolonging the operation time. Again, further improvement in product purity would be highly desirable. The processes also lack satisfactory reproducibility in the extract's purity. Thus it is difficult to obtain, through those processes, a high-purity product such as four-nine or five-nine grades with good qualitative reproducibility.

Within the above environment studies have been made with the view towards providing a solvent extraction process for the purification of beryllium using EDTA as a masking or sequestering agent, which is freee of the foregoing drawbacks or disadvantages, and it was discovered that, in an aqueous solution system having a pH of 4.5–9, preferably 5–6.5, containing a beryllium compound, an aminopolycarboxylic acid, e.g. EDTA, water and a compound selected from the group consisting of $\beta$-ketocarboxylic esters and malonic diesters, which are less expensive and more easily available as compared with acetylacetone, e.g., ethyl acetoacetate, the beryllium compound forms a chelate compound with the ethyl acetoacetate, and that, when the system is extracted with a water-immiscible organic solvent such as kerosene, the chelate compound of beryllium is selectively extracted into the solvent phase with high extractability. It was found that, while sufficient back-extraction of the above extracted organic solvent phase from the aqueous acid phase in accordance with conventional practices, e.g., the method using acetylacetone-EDTA, requires several tens of minutes, the back-extraction in accordance with the subject process requires only several minutes.

Furthermore, it is confirmed that a very high-purity product can be obtained through the subject process with high qualitative reproducibility. For example, a product of five-nine grade can be constantly obtained.

Accordingly, the primary obect of the present invention is to provide a solvent extraction process for the purification of beryllium, which has successfully overcome the deficiencies or disadvantages inherent in the conventional solvent extraction process using EDTA as a masking agent or sequestering agent, and which can produce very high-purity beryllium compounds with good qualitative reproducibility and high yield.

Still many other objects and advantages of the invention will become more apparent from the following descriptions.

According to the subject process, an aqueous solution containing the beryllium compound to be purified, an aminopolycarboxylic acid, water, and a compound selected from the group consisting of $\beta$-ketocarboxylic esters and malonic diesters, is prepared, with a pH of from 4.5–9, preferably 5–6.5.

As the aminopolycarboxylic acid, ethylenediaminetetraacetic acid or 2-ammonium salt thereof (EDTA) are most commonly employed, but if desired, such other aminopolycarboxylic acids as, for example, cyclohexanediaminetetraacetic acid, diethylenetriaminepentaacetic acid, glycoletherdiaminetetraacetic acid, hydroxyethylethylenediaminetriacetic acid, or ammonium salts of the foregoing, etc. may also be used.

As the $\beta$-ketocarboxylic esters, for example, aliphatic lower alkyl esters containing $C_1$–$C_8$ alkyl radicals, or aryl esters, of acetoacetic acid, such as ethyl, butyl octyl, and phenyl acetoacetates; aliphatic lower alkyl esters containing $C_1$–$C_6$ alkyl radicals, or aryl esters, of benzoylacetic acid, such as ethyl, amyl and phenyl benzoylacetates; di-aliphatic lower alkyl esters of malonic acid containing $C_1$–$C_6$ alkyl radicals, such as diethyl, di-n-propyl, and diamyl malonates; and di-aryl or alkyl aryl esters of malonic acid such as diphenyl, and ethyl benzyl malonates; may be used.

Furthermore, as the beryllium compounds to be purified, any of the compounds which can form an aqueous solution system or a substantially aqueous homogeneous solution system with a pH regulated to between 4.5–9, together with an aminopolycarboxylic acid, water, and a compound selected from $\beta$-ketocarboxylic esters and malonic diesters can be used. For example, mineral acid salts of beryllium such as beryllium chloride, sulfate, nitrate, phosphate, etc.; inorganic compounds of beryllium such as beryllium perchlorate, hydroxide, oxide, carbonate, etc.; lower aliphatic mono- or polycarboxylates of beryllium such as beryllium acetate, tartrate, etc.; and aromatic carboxylates of beryllium such as beryllium benzoate, etc. may be named.

If necessary for the formation of starting aqueous solution system, mineral acids may be added to the system. Also for pH adjustment, an acid or an alkali can be optionally added to the system. For instance, the starting beryllium compound is dissolved in sulfuric acid, added with water to form an aqueous sulfuric acid system, and to which EDTA and a compound selected from the group consisting of $\beta$-ketocarboxylic esters and malonic diesters are added. The pH of the system may be adjusted with an ammonium hydroxide solution.

In the aqueous solution system having a pH between 4.5 and 9, containing a crude beryllium compound, an aminopolycarboxylic acid, water, and a compound selected from the group consisting of $\beta$-ketocarboxylic esters or malonic diesters, the beryllium compound forms a water soluble chelate compound with the $\beta$-ketocarboxylic esters or malonic diesters, and the metallic impurities which may include Fe, Al, Ni, Cu, etc., also form a water-soluble chelate compound with the aminopolycarboxylic acid. Furthermore, such metallic and nonmetallic impurities as Si, P, Na, etc. are present as dissolved in the aqueous solution system, as unreacted impurities.

When the pH of the solution system is below 4.5, the chelate of the beryllium compound is hardly formed. Whereas, if it exceeds 9, hydroxides are formed which disturb the extractability of the chelate from the solution.

For these reasons, the pH is adjusted to be between 4.5–9. The optimum results are obtained at a pH around 6. Therefore preferably the adjustment of the pH to approximately 5–6.5 is recommended. In the preparation of the aqueous solution system with the pH duly regulated, it is recommended that the pH should be moved successively from the lowest feasible value to the higher side.

The chelate compound of beryllium with $\beta$-ketocarboxylic ester or malonic diester (beryllium:$\beta$-ketocarboxylic ester or malonic diester=1:2) which is present in the aqueous solution system as a solute migrates selectively into the organic solvent phase, when the system is extracted with a water-immiscible organic solvent, while other metallic impurities remain in the aqueous phase.

As such water-immiscible organic solvent, aliphatic hydrocarbons such as kerosene, hexane, etc., aromatic hydrocarbons such as benzene, toluene, xylene; esters such as n-butyl acetate, iso-amyl acetate, etc.; and ketones such as methyl iso-butyl ketone, methyl propyl ketone, etc.; may be used.

The aqueous phase extraction residue may be subjected to repeated extraction with the water-immiscible organic solvent, if desired, and thus extracted organic solvent phase may be combined with the first extracted organic solvent phase, to both be subjected to the subsequent back-extraction step with an aqueous mineral acid.

According to the subject process, the extracted organic solvent phase is then subjected to a back-extraction step with an aqueous mineral acid, to decompose the chelate compound of beryllium, as well as to selectively migrate the beryllium compound to the aqueous mineral acid phase.

In advance of the back-extraction with aqueous mineral acid, the water-immiscible organic solvent phase may be washed with an aqueous solution of aminopolycarboxylic acid, to remove the possibility of mixed-in other metallic impurities.

As the mineral acid, sulfuric, hydrochloric, nitric, or perchloric acid, or the like may be used. These acids are normally used as an aqueous solution with a concentration of at least 1 N. For example, 1 N–6 N aqueous mineral acid solutions can be used. The resulting aqueous mineral acid solution may be washed with water-immiscible organic solvent, so that any entrained $\beta$-ketocarboxylic ester or malonic diester may be removed. After such washing, the water-immiscible organic solvent can be removed by, for example, heating the system under reduced or atmospheric pressure to cause volatilization of the solvent.

The beryllium compound thus back-extracted into the aqueous mineral acid phase can be recovered by various means.

For example, in a preferred practice an alkaline substance from the group consisting of ammonium hydroxide and ethylenediamine is added to the aqueous solution phase, to hydrolyze the beryllium compound. Thus beryllium can be precipitated and separated as beryllium hydroxide. In that practice, the alkaline substance is preferably added in such an amount as will adjust the pH of the system to 8–10. In the hydrolyzing reaction, the system is conveniently heated to accelerate the reaction rate. Normally the system is heated to the boiling point. In a still more preferred practice, aminopolycarboxylic acid is added to the system in advance of the hydrolysis effected by addition of the alkaline substance. The amount of the aminopolycarboxylic acid may be approximately 0.001–0.05 M, to satisfactorily achieve the intended effect.

If desired, still other recovery processes may be employed. For example, aminopolycarboxylic acid, acetylacetone, and an alkaline substance selected from the group consisting of ammonium hydroxide and ethylenediamine, are added to the aqueous mineral acid phase, to cause hydrolysis similarly to the first-mentioned recovery process, and the product can be recovered as the precipitated beryllium hydroxide.

The beryllium hydroxide may then be ignited, if desired, for example, calcined at 900–1400° C. to be converted to high-purity beryllium oxide.

Furthermore, the beryllium oxide may be once more dissolved in an optional acid, if desired, and therefrom recovered as crystalline precipitate of beryllium salt of the acid employed.

The β-ketocarboxylic esters and malonic diesters, for example, ethyl acetoacetate, employed in the invention are readily available at much lower cost than that of conventionally employed acetylacetone, such as ⅕ to ¹⁄₁₀ of the latter, while achieving extraction of beryllium with high extractability. Again the back-extraction step using aqueous mineral acid in accordance with the invention can satisfactorily achieve the purpose within a few minutes, for example, 1–3 minutes, while several tens of minutes, e.g. 20–40 minutes are required for the back-extraction step in the prior art processes to achieve an equally satisfactory result. Thus the operation time can be markedly shortened in the subject process.

The process also has an excellent purification effect. Thus by the process high-purity beryllium compound such as of five-nine grade can be produced with high yield and good qualitative reproducibility. The metallic impurities contents of purified beryllium compound are, when calculated per gram of beryllium oxide, for example, not higher than 10 $\mu$g. of silicon, and no more than 1 $\mu$g. each of iron, aluminum, copper, and nickel, etc.

Hereinafter several embodiments for practicing the subject process will be explained by means of working examples, with controls for comparison purpose.

EXAMPLE 1 AND CONTROL 1

Ten (10) g. of beryllium oxide (the gram number from which the possibly contained impurities' weight was excluded) were dissolved by heating with 10 ml. of 48% sulfuric acid and, if necessary, small volumes of 48% hydrofluoric acid. After heating the system sulfuric fumes, 5 ml. of 96% sulfuric acid was added, followed by heating to sulfuric fumes again, and the resulting solution was made to 2.5% sulfuric acid in the total amount of 500 ml. The metallic impurities contents in the starting crude beryllium oxide were as follows, as expressed by the unit of p.p.m.: Si:2,000, Al:760, Ca:800, Cu:40, Na:3,200, Fe:100, and Mg:1,200. To the solution 50 ml. of 0.2 M aqueous solution of EDTA (2-ammonium salt) was added, and the total amount of the system was made 1 liter by addition of water.

To the solution then 200 g. of ethyl acetoacetate was added, and the pH of the system was adjusted to 6.3 with 7 N aqueous solution of ammonium hydroxide.

This aqueous solution system was thoroughly mixed with 1 liter of kerosene by 3 minutes' shaking, and the ethyl acetoacetate chelate compound of beryllium was extracted. The system was allowed to stand to cause separation of aqueous phase from the organic solvent phase, and the upper organic solvent phase was recovered.

To the aqueous phase, 50 g. each of ethyl acetoacetate was added, and the system was again repeatedly subjected to the extraction similar to the above, using kerosene, to extract the possibly remaining ethyl acetoacetate chelate compound of beryllium into the organic solvent phase.

The resulting organic solvent phases were combined, washed with 400 ml. of 0.01 M aqueous solution of EDTA (of which pH having been adjusted to approximately 9 with ammonium hydroxide), and thoroughly shaken with 500 ml. of 6 N sulfuric acid for 2 minutes. Thus the ethyl acetoacetate chelate compound of beryllium was decomposed, and the beryllium compound was back-extracted to the aqueous sulfuric acid phase.

The aqueous sulfuric acid solution obtained by separating and recovering the aqueous phase was washed several times, each time with 100 ml. of kerosene, to be completely removed of the possibly mixed-in ethyl acetoacetate, and thereafter heated to volatilize the kerosene.

Then the aqueous sulfuric acid solution was cooled to room temperature, and following the addition thereto of 40 ml. of 0.2 M EDTA aqueous solution, the pH of the system was adjusted to 9.2 with aqueous ammonium hydroxide solution. Water was added to make the total quantity 8 liters, and the system was heated to boiling with stirring. The precipitate which separated in the form of beryllium hydroxide was filtered, washed with water and dried, and calcined at 1,050° C. to produce 9.92 g. of purified beryllium oxide. The yield was 99.2%. In the purified product, the metallic impurities content was reduced to the values below, as expressed by p.p.m.:Si:7.6, Al:0.8, Ca<0.2, Mg<0.2, Na:0.8, Cu<0.1, and Fe<0.1. Spectrophotometric method was used for the analysis of above metallic impurities except Na of which content was determined by atomic absorption spectrometric method.

When the above Example 1 was repeated except that the ethyl acetoacetate was replaced by acetylacetone (Control 1), 30 minutes were required for the back-extraction using similarly 6 N sulfuric acid. Thus obtained purified beryllium oxide weighed 8.51 g. (yield: 85.1%), and its metallic impurities contents (p.p.m.) were as follows: Si:26, Al:12.5, Ca:6.8, Mg:3.2, Na:2.2, Cu<0.1, and Fe<0.1.

The results of Example 1 and Control 1 are given in Table 1 below, in which the qualitative reproducibility test was performed as follows:

Qualitative reproducibility test:

The refining procedures under identical conditions were performed 25 runs, and the ratio of number of runs in which five-none grade purified product was obtained to the total runs (percent) was calculated as the norm for evaluating the reproducibility.

TABLE 1

|  | Example 1 | Control 1 |
|---|---|---|
| Time required for back-extraction (min.) | 2 | 30 |
| Yield (percent) | 99.2 | 85.1 |
| Qualitative reproducibility (percent) | 96 | 60 |

EXAMPLE 2

The aqueous sulfuric acid solution remaining after the removal of kerosene by volatilization in Example 1 was cooled to room temperature, and to which 40 ml. of 0.2 M aqueous EDTA solution and 600 ml. of 1 M aqueous acetylacetone solution were added by the order stated. Subsequently the pH of the system was adjusted to 9.2 with ethylenediamine. Water was added to the system to make the total quantity 8 liters, and the system was heated to boiling under stirring. All other procedures were performed under identical conditions with those employed in Example 1.

The yield of purified beryllium oxide was 98.6%. The purity (metallic impurities contents) and qualitative reproducibility were equally favorable to those of the product of Example 1.

EXAMPLES 3-14

Example 1 (or 2) was repeated with the type and quantity of the beryllium compound to be purified, type and quantity of β-ketocarboxylic ester or malonic diester, type of water-immiscible organic solvent, type, concentration, and quantity of the acid used for the back-extraction altered in various manner in each run. The results were as shown in Table 2.

TABLE 2

| Example No. | Beryllium compound to be purified | | β-Ketocarboxylic ester of malonic diester | | Water-immiscible organic solvent | Quantity (g.) | Back-extraction | | | Result | |
| --- | --- | --- | --- | --- | --- | --- | --- | --- | --- | --- | --- |
| | Type | Quantity (g.) | Type | Quantity (g.) | | | Acid used | Concentration (N) | Quantity (ml.) | Time required (min.) | Yield (percent) | Purity |
| 3 | Beryllium sulfate | | Butyl acetoacetate | 70 | Benzene | 240 | Sulfuric acid | 2 | 1,200 | 2 | 99.2 | 99.9992 |
| 4 | Beryllium hydroxide | | Octyl acetoacetate | 17 | Chloroform | 310 | Hydrochloric acid | 4 | 700 | 2 | 98.8 | 99.9996 |
| 5 | Beryllium acetate | | Phenyl acetoacetate | 40.5 | Cyclohexane | 240 | do | 6 | 550 | 1 | 99.4 | 99.9995 |
| 6 | Beryllium oxide | | Ethyl benzoylacetate | 10 | Benzene | 300 | Sulfuric acid | 3 | 1,200 | 3 | 99.1 | 99.9991 |
| 7 | Beryllium nitrate | | Butyl benzoylacetate | 75 | do | 330 | do | 2 | 1,500 | 2 | 98.7 | 99.9994 |
| 8 | Beryllium chloride | | Amyl benzoylacetate | 60 | do | 350 | Nitric acid | 2 | 1,500 | 1 | 98.3 | 99.9994 |
| 9 | do | | Phenyl benzoylacetate | 60 | Cyclohexane | 320 | Sulfuric acid | 6 | 500 | 1 | 98.9 | 99.9991 |
| 10 | do | | Diethyl malonate | 70 | Methyl isobutyl ketone | 240 | do | 6 | 500 | 1 | 98.9 | 99.9994 |
| 11 | Beryllium sulfate | | Di-n-propyl malonate | 10 | do | 280 | do | 4 | 700 | 1 | 98.7 | 99.9991 |
| 12 | Beryllium oxide | | Diamyl malonate | 17 | Butyl n-acetate | 350 | Nitric acid | 4 | 700 | 2 | 99.2 | 99.9993 |
| 13 | Beryllium sulfate | | Diphenyl malonate | 17 | Toluene | 380 | do | 2 | 740 | 1 | 99.5 | 99.9992 |
| 14 | Beryllium hydroxide | | Ethylbenzyl malonate | 17 | Cyclohexane | 340 | Sulfuric acid | 4 | 1,200 | 2 | 99.3 | 99.9996 |
| | | | | | Benzene | | | | 800 | | | |

EXAMPLE 15

Example 1 was repeated except that the ethylenediaminetetraacetic acid (EDTA) was replaced by hydroxyethylethylenediaminetriacetic acid. The time required for the back-extraction was 1 minute, the purity of the treated beryllium compound was 99.9991%, and the yield was 98.9%.

EXAMPLE 16

Example 2 was repeated except that the EDTA was replaced by glycoletherdiaminetetraacetic acid. The time required for the back-extraction was 1 minute, purity of the treated beryllium compound was 99.9993%, and the yield was 99.2%.

We claim:
1. A solvent extraction process for the purification of beryllium using an aminopolycarboxylic acid as a masking or sequestering agent, which comprises
  (i) preparing an aqueous solution system having a pH of from 4.5 to 9 containing a beryllium compound to be purified, an aminopolycarboxylic acid selected from the group consisting of ethylenediamine tetraacetic acid, glycol etherdiamine tetraacetic acid, hydroxyethyl-ethylenediamine triacetic acid, cyclohexanediamine-tetraacetic acid, diethylenetriaminepentaacetic acid and ammonium salts thereof, water, and a compound selected from the group consisting of $C_1$–$C_8$ alkyl acetoacetate, phenyl acetoacetate, $C_1$–$C_6$ alkyl benzoyl acetate, phenyl benzoyl acetate, $C_1$–$C_6$ dialkyl malonate, diphenyl-malonate and ethyl benzyl-malonate,
  (ii) extracting said aqueous solution system with a water-immiscible, organic solvent to form an organic solvent phase,
  (iii) back-extracting said organic solvent phase with an aqueous solution of a mineral acid to form an aqueous solution phase, and
  (iv) recovering said beryllium compound from said aqueous solution phase.
2. The process of claim 1, wherein said recovering step (iv) is effected by adding an alkaline substance selected from the group consisting of ammonium hydroxide and ethylenediamine to said aqueous solution phase to cause alkaline hydrolysis and form a precipitate of beryllium hydroxide, and recovering said precipitate of beryllium hydroxide.
3. The process of claim 1, wherein said recovering step (iv) is effected by adding an aminopolycarboxylic acid, acetylacetone, and an alkaline substance selected from the group consisting of ammonium hydroxide and ethylenediamine, to said aqueous solution phase to cause alkaline hydrolysis and form a precipitate of beryllium hydroxide, and recovering said precipitate of beryllium hydroxide.
4. The process of claim 2, wherein said recovered precipitate of beryllium hydroxide is converted to beryllium oxide by heating said precipitate.
5. The process of claim 2, wherein said recovered beryllium hydroxide is converted to an acid salt of beryllium, by contacting said precipitate with an acid.
6. The process of claim 2, said alkali hydrolysis is performed at a pH ranging from 8 to 10.
7. The process of claim 3, wherein said alkali hydrolysis is performed at a pH ranging from 8 to 10.
8. The process of claim 1, wherein the pH of said aqueous solution phase in step (i) is adjusted to 5–6.5.
9. The process of claim 1, wherein said aminopolycarboxylic acid is ethylenediaminetetraacetic acid.
10. The process of claim 1, wherein said aminopolycarboxylic acid is selected from the group consisting of cyclohexanediaminetetraacetic acid, diethylenetriaminepentaacetic acid, glycoletherdiaminetetraacetic acid, and hydroxylethylethylenediaminetriaacetic acid.
11. The process of claim 1, wherein said compound is selected from the group consisting of ethylacetoacetate, ethyl benzoylacetate, and diethyl malonate.

12. The process of claim 1, wherein said beryllium compound to be purified in the step (i) is a compound selected from the group consisting of beryllium chloride, beryllium sulfate, beryllium nitrate, beryllium perchlorate, beryllium hydroxide, beryllium oxide, lower aliphatic mono- or poly-carboxylate of beryllium, and aromatic carboxylate of beryllium.

13. The process of claim 1, wherein said organic solvent employed in step (ii) is selected from the group consisting of kerosene, benzene, chloroform, methyl isobutyl ketone, butyl acetate, and cyclohexane.

14. The process of claim 3, wherein said recovered precipitate of beryllium hydroxide is converted to beryllium oxide by heating said precipitate.

15. The process of claim 3, wherein said recovered beryllium hydroxide is converted to an acid salt of beryllium by contacting said precipitate with an acid.

References Cited

UNITED STATES PATENTS 3,359,064  12/1967  Crouse et al. _____ 23—24 B

OTHER REFERENCES

Grinstead et al.: "Nuclear Science and Engineering," vol. 28, 1967, pp. 346–352.

Alimarin et al.: "Journal of Analytical Chemistry, U.S.S.R." vol. 11, 1956, pp. 405–408.

Bamberger et al.: "Nuclear Science and Engineering," vol. 22, 1965, pp. 14–19.

Moore et al.: "Nuclear Science and Engineering," vol. 17, 1963, pp. 268–273.

HERBERT T. CARTER, Primary Examiner

U.S. Cl. X.R.

423—624